United States Patent [19]

Schleicher et al.

[11] Patent Number: 5,585,048
[45] Date of Patent: Dec. 17, 1996

[54] PYROTECHNIC MIXTURE AND GAS GENERATOR FOR AN AIRBAG

[75] Inventors: Ulrich Schleicher, Hersbruck; Martin Klober, Heideck; Wolfgang Schwarz, Nuremberg; Eugen Feuerstake, Erlangen, all of Germany

[73] Assignees: Diehl GmbH & Co., Germany; Honda Giken Kogyo Kabushiki Kaisha, Japan

[21] Appl. No.: 477,577

[22] Filed: Jun. 7, 1995

Related U.S. Application Data

[62] Division of Ser. No. 125,029, Sep. 21, 1993.

[30] Foreign Application Priority Data

Sep. 21, 1992 [DE] Germany .......................... 42 31 521.2
Apr. 2, 1993 [DE] Germany .......................... 43 10 853.9

[51] Int. Cl.[6] ................................................ C06B 21/00
[52] U.S. Cl. ................................. 264/3.4; 149/109.6
[58] Field of Search .......................... 264/3.4; 149/109.5

[56] References Cited

U.S. PATENT DOCUMENTS

| 3,907,330 | 9/1975 | Kondo et al. . |
| 3,920,575 | 11/1975 | Shiki et al. . |
| 4,243,443 | 1/1981 | Utracki . |
| 4,734,141 | 3/1988 | Cartwright et al. . |
| 4,796,912 | 1/1989 | Lauritzen et al. . |
| 4,846,368 | 7/1989 | Goetz . |
| 5,087,070 | 2/1992 | O'Loughlin et al. . |
| 5,125,684 | 6/1992 | Cartwright . |
| 5,149,129 | 9/1992 | Unterforsthuber et al. . |
| 5,273,313 | 12/1993 | Klober et al. .......................... 280/741 |
| 5,495,807 | 3/1996 | Klober et al. .......................... 102/289 |

FOREIGN PATENT DOCUMENTS

| 0069441A2 | 1/1983 | European Pat. Off. . |
| 0467731 | 1/1992 | European Pat. Off. . |
| 0474115A1 | 3/1992 | European Pat. Off. . |
| 0496267A1 | 7/1992 | European Pat. Off. . |
| 2673119 | 8/1992 | France . |
| 2334063 | 1/1974 | Germany . |
| 2351379 | 4/1974 | Germany . |
| 3727851 | 7/1988 | Germany . |
| 3744750 | 7/1988 | Germany . |
| 3824162A1 | 1/1990 | Germany . |
| 3909841A1 | 9/1990 | Germany . |
| 3920401 | 1/1991 | Germany . |
| 3935869C1 | 7/1991 | Germany . |
| 4005768A1 | 8/1991 | Germany . |
| 4116879 | 11/1992 | Germany . |
| 50/040487 | 4/1973 | Japan . |
| 63/57258 | 11/1988 | Japan . |

Primary Examiner—Charles T. Jordan
Assistant Examiner—Anthony R. Chi
Attorney, Agent, or Firm—Scully, Scott, Murphy & Presser

[57] ABSTRACT

A pyrotechnic mixture in the form of granulates, encompassing a nitrogen-generating substance, an inorganic oxidizing medium and a binder constituted of silicone rubber. Also disclosed is a process for the production of this pyrotechnic mixture, as well as a gas generator for an airbag which contains the pyrotechnic mixture as a propellant charge. The pyrotechnic mixture is in the form of granulates for a propellant charge which generates a non-toxic gas, encompassing the nitrogen-generating substance, especially an alkali metal azide or earth alkali metal azide, an inorganic oxidizing medium consisting of alkali metal nitrate and/or alkaline earth metal nitrate and silicone rubber.

13 Claims, 3 Drawing Sheets

PYROTECHNIC MIXTURE AND GAS GENERATOR FOR AN AIRBAG

This is a divisional of copending application Ser. No. 08/125,029, filed on Sep. 21, 1993.

BACKGROUND OF THE INVENTION

1. Field of the Invention

The present invention relates to a pyrotechnic mixture in the form of granulates, encompassing a nitrogen-generating substance, an inorganic oxidizing medium and a binder constituted of silicone rubber. Moreover, the invention relates to a process for the production of this pyrotechnic mixture, as well as to a gas generator for an airbag which contains the pyrotechnic mixture as a propellent charge.

2. Discussion of the Prior Art

From the disclosure of German DE A 39 20 401 there is presently known a gas generator for an airbag, in which a chamber is positioned about a cylindrical pressure container which is filled with gas-liberating substances. This chamber encompasses a filter. This filter receives an oncoming flow of the gas through apertures which are arranged at a base end thereof. The gas then streams through the filter in the longitudinal direction of the latter and passes through apertures provided at the head end of the chamber into the airbag. That type of gas generator, in view of the presence of its pressure container, necessitates the provision of sufficiently heavy wall thicknesses. In addition thereto, it is necessary to provide a separate chamber for the installation of the filter. As a consequence, the gas generator becomes expensive. Considerable flow losses which are encountered because of the presence of the filter lead to lower mass flows; in essence, meaning that the period of time which elapses commencing from the ignition of the gas-liberating substances until the gas has filled the airbag is lengthy. The propellent charge is present in the form of tablets.

Further gas generators for airbags are described; for example, in U.S. Pat. Nos. 3,907,330, 5,087,070 and 5,149,129. Also in such gas generators is the propellent medium ordinarily employed in the form of pellets, tablets or cylindrical molded bodies. In order to break open these molded bodies, it is necessary to expend a relatively considerable quantity of energy. Further energy losses are encountered through the lengthy path of flow for the gases in the gas generator.

European Patent A-0 467 731 pertains to a solid pyrotechnic composition, which contains an alkali metal or alkaline earth metal azide, an inorganic oxidizing medium and, as a component in the amount of 5%–40% of the total composition, an inorganic binder medium, which is the product of a polycondensation reaction of alumino silicates. Pursuant to EP-A-0 467 731 (page 2, lines 42 through 45), organic binder media in pyrotechnic compositions are not considered to be particularly suitable, inasmuch as they propagate the formation of toxic combustion gases.

German Patent Publications DE-A-37 27 851 and DE-A-37 44 750 relate to pyrotechnic compositions in the form of lumpy pieces or bodies which contain fibers in a proportion of 2%–6% by weight, generally such as graphite fibers, or fibers consisting of iron or glass fibers. In order to improve upon the ignition, the lumpy body can be imparted a coating which; among other constituents, contains silica, a fluorine elastomer and magnesium. The fibers serve for reinforcing the lumpy body or piece and minimize the possibility in the development of fissures in the body through which there are created undesirable additional surface areas which can conceivably produce an acceleration in the speed of combustion of the lumpy body, in an unpredictable manner.

The Japanese Patent Publication 63-57258 relates to a pyrotechnic composition for airbags, which contains a buffer material in the form of a mesh of stainless steel fibers. For an airbag on the driver's side (which usually possesses a volume of about 60 liters), there are employed 87 grams of the gas-generating mixture. Fore an airbag on the passenger side (which usually possesses a volume of about 120 to 150 liters), there are employed 400 grams of the gas-generating mixture. These large quantities of gas-generating mixture lead to disposal problems; for instance, to an extremely high degree of heating during the burning off of the mixture, whereby this heat must be contained through the construction of the gas generator in order to prevent a bursting of the airbag.

German OS 23 34 063 and German OS 23 51 379 describe the utilization of silicone rubber as a nitrogen-free oxygen-containing binder medium in a composite powder which contains 78% to 92% by weight of a chlorate or perchlorate oxidizing medium. The preferred content of the silicone rubber is indicated as being 8% to 14.6% by weight. Beyond this limit of the content of the binder medium there is attained an excessively high carbon monoxide content during the combustion. The composite powder is compressed into compacts or bars each having a length of 30 mm and a diameter of 4.3 mm (referring to German OS 23 51 379, page 8).

The published Japanese Patent Appln. 50-040487 describes the addition of $SiO_2$-containing inorganic binder media to pyrotechnic mixtures, which contain metal azide and an inorganic oxidizing medium. It is reported that, for a constituent of more than 10% of a binder medium, the ignition of the pyrotechnic composition is considerably slowed down, whereby such a content is not suitable for use in actual practice.

German DE-A-41 16 879, published on Nov. 26, 1992, describes a gas-generating mixture in the form of granulates, which consist of a metal azide, an oxidizing medium and nitrocellulose, and which are coated with a rapidly burning igniting mixture which contains boron and potassium nitrate. This granulated gas composition is provided with silicone rubber in a proportion of 35% relative to the gas-generating mass, and formed into a foil-shaped elastic layer. The employment of a mixture which is based on a metal azide, and an oxidizing medium and silicone rubber in the form of granulates as a propellent charge in airbags is not taught in this publication.

A disadvantage of pyrotechnic mixtures for airbags which are known from the current state-of-the-technology consists of in that, in order to achieve a high packing density and to avoid dissociation of the ingredients, these must be employed in the form of tablets, cylindrical bodies or foils which, due to the small available-reaction surface, leads to that large quantities of these mixtures are required for the inflating of the airbag. Furthermore, during the burning down of the pyrotechnic mixtures, there are produced large quantities of strongly alkaloid substances (for example, $K_2O$, $Na_2O$), which notwithstanding the employment of inorganic binder media which are based on silicates, can only be poorly neutralized.

SUMMARY OF THE INVENTION

Accordingly, it is an object of the present invention to be able to at least partially avoid the above-described disadvantages encountered in the state-of-the-technology; in essence, to prepare a pyrotechnic mixture which is particularly adapted for airbags, which is employable in smaller quantities in comparison with known mixtures, which exhibit good combusting properties over a broad temperature range and during the employment of which there are generated the least possible toxic combustion products.

This object is attained through a pyrotechnic mixture in the form of granulates, encompassing a nitrogen-generating substance, especially an alkali metal azide, alkaline earth metal azide or ammonium azide, an inorganic oxidizing medium and silicone rubber as a binder, whereby the granulate presently encompasses a plurality of particles of the nitrogen-generating substance and the inorganic oxidizing medium which are held together by the silicone rubber, which possess a size of from 1 μm up to 200 μm, whereby the silicone rubber is present in a constituent of from 13% to 28% relative to the weight of the total mixture.

The inventive pyrotechnic mixture, in comparison with known propellent charges for airbag generators, exhibits significant advantages. Due to its being granulated; for example, in a granular-lumpy or extrusion-pressed lumpy form, the inventive mixture possesses the advantage that during the combustion there always remains present an equally-sized combustion surface. Consequently, the burning down behavior in a high-pressure container is controllable. The combustion is then carried out in dependence upon the ignition towards all sides, in essence, spherically. Similarly, the conversion of the pyrotechnic mixture commencing from the point in time of the ignition up to its complete combustion is outstandingly controllable. The combustion pressure over the span of the combustion period is, at every point in time, extremely low and uniform. In the same manner, the maximum gas pressure remains low. This, in turn, has the result that through the employment of the inventive pyrotechnic mixture, it is possible to utilize a thin-walled container in a gas generator for airbags.

The inventive pyrotechnic mixture is in the form of granulates which, in general, possess a grain size of at least 80 μm, preferably from 200 μm to 12 mm, especially preferably from 500 μm to 4 mm, and most preferred from 800 μm to 2.5 mm. These values which are given for the grain size of the granulates relate hereby to the median grain size present in the mixture; in effect, individual granulates can lie outside this range of sizes; however, the overwhelming component of the granulates should lie within this given range. The grain sizes of the granulates can be determined through sifting screens.

The granulates contain particles of a nitrogen-generating substance and an inorganic oxidizing medium. The median or average size of these particles reaches, in general, from 1 μm to 200 μm, preferably from 2 to 100 μm, and especially preferably from 2 to 80 μm. The production of these particles can be carried out, for example, through a separate grinding of the nitrogen-generating substance and of the inorganic oxidizing medium to the desired particle sizes through the application of known methods; for instance, in a pinned disc mill or in a rotary mill.

The nitrogen-generating substance is especially an alkali metal azide, an alkaline earth metal azide or an ammonium azide. However, there can also be employed organic nitrogen-generating substances, such as generally tetrazol derivatives; for example, guanidinium-5.5'-azatetraazolate. Particularly preferred are the alkali metal azides, especially sodium azide, potassium azide or mixtures thereof. Most especially preferred is sodium azide.

The inorganic oxidizing medium can be selected; for example, from the group of the metal nitrates, metal oxides, metal chlorates and metal perchlorates, whereby there are preferred metal nitrates and metal oxides (for example, thermite materials) and metal nitrates, especially such as the alkali metal nitrates or alkaline earth metal nitrates. Especially preferred is when the inorganic oxidizing medium encompasses potassium nitrate, sodium nitrate or mixtures thereof. In a quite especially preferred embodiment, the nitrogen-generating substance comprises sodium azide and the inorganic oxidizing medium comprises potassium nitrate.

The nitrogen-generating substance is preferably present as a constituent of 35% to 60% relative to the weight of the total mixture, computed for sodium azide as the nitrogen-generating substance, and the inorganic oxidizing medium is preferably present as a constituent of 20% to 45% relative to the weight of the total mixture, computed for potassium nitrate as the inorganic oxidizing medium. These constituents or proportions for the ranges of the nitrogen-generating substance and of the inorganic oxidizing medium are computed for sodium azide and, respectively, potassium nitrate; in essence, they relate to the molar constituent of these substances in the mixture. In the employment of other chemical compositions as nitrogen-generating substances and, respectively, as inorganic oxidizing media, the mentioned percentage ranges can vary in conformance with the molecular weight of the currently employed substances.

Pursuant to a further aspect, the present invention relates to a pyrotechnic mixture in the form of granulates for a propellent charge which generates a nontoxic gas, encompassing a nitrogen-generating substance, especially an alkali metal azide or earth alkali metal azide, an inorganic oxidizing medium consisting of alkali metal nitrate and/or alkaline earth metal nitrate and silicone rubber, whereby the constituent of azide consists of 35% to 60% by weight, the nitrate constituent of 20% to 45% by weight and the silicone rubber constituent of 13% to 28% by weight, whereby the azide and the nitrate in the granulate possess a grain size of from 1 to 200 μm, and the granulate has a bulk density of from 0.35 to 1.2 g/cm$^3$.

The nitrogen-generating substance is preferably present as a constituent of 48% to 58%, and mostly preferably of 50% to 55% by weight, relative to the weight of the total mixture, always computed for sodium azide as the nitrogen-generating substance. The inorganic oxidizing medium is preferably present as a constituent of 23% to 33%, and mostly preferably as a constituent of 25% to 30% relative to the weight of the total mixture, computed for potassium nitrate as the inorganic oxidizing medium.

The particles of the nitrogen-generating substance and the inorganic oxidizing medium in the inventive granulate are held together by silicone rubber, whereby the concept "held together" encompasses that the particles are adhesively interconnected or bonded by the silicone rubber and also can be at least partially encased thereby. In the interior thereof, the inventive granulate can also possess a spongy-like porous structure. As a measure for the porous structure of the granulate there can be employed the bulk density, in essence, the ratio of the bulk density of the granulate relative to the theoretical density of a compact member. The inventive granulate possesses a bulk density of preferably 20% to 70%, especially preferably 20% to 50%, and most preferably of 20% to 35% of the theoretical density, which can be computed from the specific densities of the individual components and their respective constituents or proportion in the pyrotechnic mixture. An especially preferred inventive mixture, which consists of 53.4% by weight of sodium azide, 27.3% by weight of potassium nitrate and 19.3% by weight of silicone rubber has, at a bulk density of 0.45 g/cm³, a bulk density of approximately 26% of that of the theoretically density, which can be computed from the specific densities for sodium azide (1.85 g/cm³), potassium nitrate (2.09 g/cm³) and silicone rubber (approximately 1.2 g/cm³), and consists of approximately 1.7 g/cm³.

In the inventive pyrotechnic mixture there is employed silicone rubber in a proportion of 13% to 28% relative to the weight of the total mixture, as a binder for the particles of the nitrogen-generating substance and the inorganic oxidizing medium. The silicone rubber is preferably present as a constituent of 15% to 25%, and especially preferred as a constituent of 17% to 23% relative to the weight of the total mixture. With the silicone rubber being the binder, the granulating of the particles is particularly simple and can be inexpensively implemented.

A further important advantage of the inventive mixture resides in that it surprisingly evidences, within a temperature range −40° C. up to 100° C., essentially constant burning-down characteristics. This is of special significance for the employment as a propellant charge in airbags, inasmuch as such an airbag must exhibit an essentially constant inflating behavior over an extremely broad temperature range. The variation in the burning-down characteristic of the inventive mixture in dependence upon the temperature is clearly superior to that of known propellant charges for airbags which are ordinarily present in the form of tablets or cylinders. Furthermore, the utilization of silicone rubber as binder imparts a mechanical resistance to abrasion and resistance to rupture by the granulate beyond the maximum period of use for an airbag of about 15 years. Vibrations and shock impulses such as are usually. encountered by motor vehicles do not exert any negative influence over the function of the propellant charge.

A further advantage obtained in the employment of silicone rubber as the binder consists of in that during the combustion process there are produced silicone dioxide and carbon dioxide from the silicone rubber, among other components, which through the decomposition of the nitrogen-generating substance and oxidizing medium can react with the resultingly formed alkaline earth metal oxides or alkali metal oxides; for instance, such as sodium oxide ($Na_2O$) and potassium oxide ($K_2O$). Thus, for example, from the highly toxic and strongly alkaline such as silicates; for example, $Na_2SiO_3$ and $K_2SiO_3$, or oxides $Na_2O$ and $K_2O$ through their reaction with $SiO_2$ and, respectively $CO_2$, there are produced harmless products, respectively, carbonates; for example, $Na_2CO_3$ and $K_2CO_3$.

A further surprising advantage of the inventive pyrotechnic mixture consists of in that its effectiveness is extremely high, as essentially caused through the energy-delivering binder system and the short reaction period in comparison with known propellant compositions. As a result thereof, significantly lower quantities of the inventive mixture are required in comparison with other propellent compositions. In addition thereto, notwithstanding the high proportion of organic materials, during the combustion process there are surprisingly not developed any significant quantities of toxic gases, such as CO. Up to now, measurements of the combustion gases resulted; for example, in a proportion of 400 to 500 ppm of CO. This CO constituent is outstandingly adapted for use in airbags.

In the employment of the inventive pyrotechnic mixture, a relatively small quantity is adequate for the filling of airbags. This, in turn, again has the consequence that the container for the combustion of the pyrotechnic mixture can be extremely small in size and can be of a lightweight construction.

Specific examples for suitable silicone rubber types are generally the products Elastosil M4500 (earlier RTVM 521), molding casing mass 56 and RTVM 622 from the company Wacker-Chemie, Germany. However, other silicone rubbers are also suitable. With respect to the term "silicone rubbers", within the context of the present invention, this relates to masses which are convertible into the rubber-elastic up to hard condition, which contain polyorganosiloxanes as basic polymers, which evidence groups accessible to a cross-linking reaction; for example, H-atoms, OH— and vinyl groups. Furthermore, filler materials can be introduced into the rubber as reinforcers, whose type and quantity can influence the mechanical and chemical state of the rubber. Especially preferred for the ignition of the pyrotechnic mixture are cold-vulcanizing (RTV) silicone rubber masses, whereby there are suited single- as well as two-component systems. The single-component systems polymerize slowly at room temperature under the influence of atmospheric moisture, whereby the cross-linking is in general effected through condensations of SiOH-groups under the formation of Si—O—Si compounds. With regard to the two-component rubbers, as cross-linkers or hardeners, there are employed; for example, mixtures of silicic acid esters (for example, ethyl silicate) or stannic or tin-organic compounds, whereby as the cross-linking reaction, for example, the formation of an Si—O—Si bridge is effected through alcohol separation. Furthermore, the silicone rubbers can also contain monomers with organo functional groups; for example, chlorine aromates, esters, epoxies, vinyl-, allyl-, amino-, carboxyl oralkoxy groups; or metal atoms which are built into the macro molecular chain; for example, Al, Ti, CO, Ni. For airbag applications, however, monomers which can lead to toxic combustion products; for instance, such as halogen-, boron- or heavy-metal containing monomers, are not preferred and, if at all employed, should be used only in small quantities.

The reaction of the nitrogen-generating substance with the inorganic oxidizing medium delivers as a gas during the ignition of the pyrotechnic mixture primarily pure nitrogen in conformance with the reaction equation (for sodium azide as the nitrogen-generating substance and potassium nitrate as the inorganic oxidizing medium):

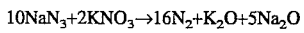

$$10NaN_3 + 2KNO_3 \rightarrow 16N_2 + K_2O + 5Na_2O$$

Surprisingly, the granulated inventive pyrotechnic mixture burns sufficiently rapidly in order to be able to inflate an airbag within the period of time required by the specifications of automobile manufacturers of 20–40 ms for airbags on the driver's side and 50 to 70 ms for airbags on the passenger side. Furthermore, the granulated pyrotechnic mixture can be produced more inexpensively then the known propellant compounds which ale employed compressed into tablet shape.

A further important aspect of the present invention resides in that the particles of the nitrogen-generating substance and the inorganic oxidizing medium are preferably not coated with a rapidly burning ignition mixture; for example, a boron-containing mixture, inasmuch as the inventive mixture already possesses an adequate burning-down speed. In a preferred embodiment of the present invention, the pyrotechnic mixture contains granulates presently encompassing a plurality of pre-granulation products which are held together by a further binder, and which possess a grain size of from 20 μm to 5 mm. Especially preferred is the grain size from the pre-granulation products of from 100 μm to 3 mm, and most preferred of from 200 μm to 600 μm.

The further binder is more expediently present in a relatively small proportion relative to the other substances, meaning in a proportion which is still just sufficient to hold the pre-granulation products together. Especially preferred is the further binder in a proportion of 0.8 to 5%, most preferred in a proportion of 1 to 3% relative to the weight of the total mixture.

The further binder can be a suitable binder with the prerequisite that it does not exhibit any disadvantageous effect on the combustion properties of the pyrotechnic mixture. Examples of suitable binders are shellack, caoutshouc and rubber binders, and particularly nitrocellulose. In a particularly preferred aspect, an inventive mixture which encompasses the pre-granulation products possesses a composition of 52.5% by weight of sodium azide, 26.9% by weight of potassium nitrate, 1.6% by weight of nitrocellulose and 19% by weight of silicone rubber.

A still further subject matter of the present invention resides in the provision of a pyrotechnic mixture, containing (a) granulates, which encompass pre-granulation products, and (b) granulates, which do not encompass any pre-granulation products. Through a variation in the proportion of the components (a) and (b) there can be extensively varied the combustion characteristics of the pyrotechnic mixture. Granulates which encompass pre-granulation products possess, in general, an extensively porous structure with a high reaction surface, which results in a rapid burning-down of the mixture. Granulates which do not encompass any pre-granulation products have, in general, a smaller reaction surface and exhibit a slower burning-down behavior. Through the preparation of a mixture of granulates (a) and (b) there can thus be achieved a variation in the burning characteristics of the pyrotechnic mixture. A mixture of that type contains preferably from 1% to 99% by weight of granulate (a) and from 99% to 1% by weight of granulate (b), especially preferred are from 10% to 90% by weight of granulate (a) and from 90% to 10% by weight of granulate (b).

On the other hand, the burning-down behavior of the inventive pyrotechnic mixture can also be varied in that there are employed granulates possessing different grain sizes and/or mixtures of granulates which contain differently sized particles. Hereby, in general, it is valid that the burning-down speed increases with a reducing size for the particles of the nitrogen-generating substance and the oxidizing medium, as well as with a reducing size for the granulate. Upon the employment of the inventive mixture in airbags, there have been proven as well suitable, for example, granulates possessing a grain size of approximately 1 mm to 2.5 mm, which are assembled from pre-granulation products having a size of approximately 200 to 600 μm.

A further aspect of the present invention pertains to a process for producing a pyrotechnic mixture in the form of granulates, encompassing the steps:

a) Preparation of particles of a nitrogen-generating substance, especially an alkali metal azide, alkaline earth metal azide or ammonium azide, and an inorganic oxidizing medium having a particle size of from presently 1 μm to 200 μm, b) Mixing the particles from a) with liquid silicone rubber; upon occasion with the addition of a curing medium, whereby the constituent of the silicone rubber is 13% to 28% relative to the weight of the total mixture, c) Producing of granulates from the materials mixed according to step b) having a grain size of 200 μm to 12 mm, and d) Curing the granulates.

The preparation of the particles of a nitrogen-generating substance and an inorganic oxidizing medium can be carried out; for example, through separate grinding of the particles to the required size; for instance, by grinding in a mill, such as either a rotary or pinned disc mill. The mixing of the ground particles with liquid silicone rubber and, insofar as required, with the addition of a hardening or curing agent, can be implemented, for example, in a kneader, whereby care must be exercised that there is obtained a homogeneous mixture. For example, the granulates can be obtained through pressing of the still moist silicone rubber mixture through a sieve with a desired mesh size, for instance, of 200 to 600 μm, whereby, to the extent that this is desired, the obtained granulates after drying thereof can be separated from fine constituents by means of a sieve. The curing of the granulate encompasses a solidification of the liquid silicone rubber and; for example, can be carried out in that the granulates are maintained at an elevated temperature for the necessary period of time.

A further aspect of the present invention resides in a process for producing a pyrotechnic mixture in the form of granulates, encompassing the steps:

a) Preparation of particles of a nitrogen-generating substance, in particular an alkali metal azide, alkaline earth metal azide or ammonium azide, and an inorganic oxidizing medium having a particle size of presently from 1 μm to 200 μm, b) Mixing the particles from a) with a binder, and upon occasion, with a solvent or suspension medium for the binder, c) Producing pre-granulation products from the materials admixed pursuant to step b) having a grain size of from 20 μm to 5 mm, d) Mixing the pre-granulate products obtained from c) with liquid silicone rubber, upon occasion with the addition of a curing agent, whereby the constituent of the silicone rubber is 13% to 28% relative to the weight of the total mixture, e) Producing of granulates from the materials mixed in accordance with step d) having a grain size of from 200 μm to 12 mm, and f) Curing the granulates.

In this embodiment of the inventive process, the particles, after they have been brought up to the required size, are admixed with a binder, and preferably with a solvent or suspension medium for the binder. The binder is preferably added in a proportion of 1% to 5%, and especially preferred in a proportion of 1% to 3% relative to the weight of the total mixture. Examples of suitable binders are nitrocellulose, shellack or elastomeric binders, for example, rubber and caoutchouc binders. Preferably, the binder is dissolved or suspended in a solution or suspending medium prior or subsequent to its addition to the particles. Examples of suitable solvents are such solvents which will readily dissolve the binder and which are concurrently easily vaporizable, and in which the particles of the nitrogen-generating substance and the inorganic oxidation medium are essentially insoluble. Examples of suitable solvents are ketones, such as acetone and methyl-ethyl ketone; alcohols, such as ethanol, and ester, such as ethylacetate. Examples of especially suitable combinations of binders and solvents are nitrocellulose/acetone, shellack/ethanol and elastomeric binder/ethylacetate.

Subsequent to the mixing of the particles with the binder, the produced mass is preferably partially dried into a pasty up to crumbly condition. From this partially dried mass there are then produced pre-granulation products; for example, through pressing of the mass through a sieve with a mesh size; for example, of from 200 to 600 μm, whereby thereafter, if required, there can be carried out a separation of fine particles. The obtained pre-granulation products are then dried prior to the mixing thereof with the silicone rubber. The mixing with the silicone rubber, the producing of granulates and the curing of the granulates is effected as described hereinabove.

The present invention, in a preferred aspect, relates to a process for producing a pyrotechnic mixture, whereby subsequent to a grinding process of the azide and the nitrate to a particle size of from 1 μm to 200 82 m there is added liquid silicone rubber, possibly with the addition of a curing medium, and thereafter there is carried out the granulation of the mixture. Subsequent to the grinding process on the initial components consisting of azide and nitrate, there can be implemented an interim granulation in which there is introduced a binder, especially nitrocellulose. Particularly preferred, the interim granulation is effected through the addition of 1% to 3% by weight, especially 1.6% by weight of nitrocellulose, and furthermore through the addition of a solvent which will readily dissolve and easily vaporize the nitrocellulose, especially an acetone, with subsequently following granulation and drying.

The silicone rubber which is employed in the inventive process for the production of the granulate, preferably possesses a viscosity of 10 to 200,000 mPas at 20° C. The viscosity of the silicone rubber thereby depends especially upon the size of the particles or, respectively, the pre-granulation products which are to be formed into granulates. For larger starting materials, there is in general employed a silicone rubber with a higher viscosity. Especially preferred is a viscosity for the silicone rubber which lies within the range of 10 to 50,000 mPas at 20° C., and most preferred lies within the range of 10,000 to 30,000 mPas at 20° C.

A still further object of the present invention is the provision of a pyrotechnic mixture which is obtainable through one of the described production processes.

The inventive pyrotechnic mixture is preferably employed as a propellent charge for the gas generators of airbags. Adapted as gas generators for the employment of the inventive pyrotechnic mixture are suitable gas generators for airbags which are known per se from the state-of-the-technology. Through the utilization of the inventive pyrotechnic mixture, it is in any event possible to considerably simplify and/or miniaturize the gas generators in comparison with those in the state-of-the-art. In general, a gas generator for the use of the inventive pyrotechnic mixture possesses a container with a plurality of discharge apertures, whereby the pyrotechnic mixture and at least one igniting element for the pyrotechnic mixture are arranged in the container.

An object of the present invention is thereby also the provision of a gas generator, especially for an airbag, which contains the inventive pyrotechnic mixture as a propellent charge. Due to the high degree of efficiency or; in essence, the effectiveness of the inventive pyrotechnic mixture, the gas generator preferably contains the pyrotechnic mixture in a quantity of from 0.05 to 0.7 g/l, especially preferred from 0.08 to 0.45 g/l, and most preferred from 0.1 to 0.3 g/l of the gas volume which is to be generated by the generator during an inflation of the airbag by means of the ignited propellent charge. Gas generators for airbags pursuant to the state-of-the-technology contain, in contrast therewith, the propellent charge in a quantity of far above 1 g/l of the gas volume which is to be generated by the generator during inflation. The inventive mixture can, in comparison therewith, be surprisingly employed in a significantly lower quantity; with good results being achieved; for example, through the use of 4.5 grams of the mixture in a 12-liter airbag or, respectively, 12 grams of the mixture in a 60-liter airbag, whereby with respect to this gas volume, there is to be understood that this is the volume of gas generated at normal pressure through the burning-down of the propellent charge. (With regard to these values for the airbag volumes there must be noted that they are normally lower than the values then the values of the above-indicated specified volumes of the reaction gases; for example, for the inflation of 60-liter airbags, there can be required a gas volume of from 80–140 1). The inventive mixture can naturally be employed not only for airbags of this size, but also for larger airbags with a volume; for example, of more than 100 l.

The measuring of this gas volume is carried out in a closed tank, especially in a tank having a volume $V_0$ (for example, 60 l), in which there is arranged; for instance, 10–20 g of propellent charge within the high-pressure container. The internal volume of the tank, prior to the igniting of propellent charge, is at an environmental pressure $P_0$ of approximately 1 atm. After the igniting of the propellent charge, there is observed a pressure rise in the tank to a value $P_{max}$. From this pressure rise $(P_{max}-P_0)$ there allows itself to then determine the volume $V_1$ of the reaction gas at environmental pressure (approximately 1 atm.):

$$V_1 = \frac{P_{max}}{P_0} \cdot V_0$$

The gas generator with the inventive mixture preferably includes a container with a plurality of discharge apertures, and in which there are located the pyrotechnic mixture and at least one igniting element. Igniting elements are known from the state-of-the-art. Examples thereof are such as mixtures consisting of boron and potassium nitrate. The igniting element is preferably not mixed together with the propellent charge, but is arranged separate therefrom. Furthermore, with respect to the igniting elements for the inventive pyrotechnic mixture, there must be noted that, due to the high degree of efficiency of the inventive mixture, it can be weaker in comparison with those in the state-of-the-art. Moreover, the arrangement of the igniting element or the igniting elements within the container is preferably such that during the igniting of granulate is prevented from being pressed into a corner. The igniting element or respectively, the ignition elements should, instead thereof, be arranged in such a manner so as to facilitate the most possibly uniform igniting of the pyrotechnic mixture. For a cylindrical container this can be achieved; for example, in that the igniting element is, or igniting elements are in the shape of a smaller hollow cylinder or cylinders arranged within the container. The activation of the igniting elements can be effected in a known manner; for instance, mechanically through shock waves, or electrically.

The container for the inventive gas generator; for example, may be essentially cylindrical in shape with a multiplicity of apertures formed about the circumference thereof, for instance, in the form of channels. Naturally, the container can, however, also possess other shapes, for example, a toroidal shape, such as generally in airbags of the current state-of-the-art. Furthermore, the container is so configured especially for airbag applications that in its interior, upon the inflation of the airbag, it can withstand the pressure which is generated by the igniting of the propellent charge. A further advantage of the inventive pyrotechnic mixture consists of in that this pressure, due to the high degree of effectiveness of the mixture, is substantially lower than that for known gas generators constructed pursuant to the state-of-the-art. The container should be configured such that it can withstand a pressure of more than 20 bar, preferably 20 to 100 bar, and especially preferably 50 to 60 bar. In the gas generators for airbags pursuant to the state-of-the-art, there are in general generated significantly higher pressures of up to 600 bar.

The low pressure which is encountered in the container of the gas generator through the use of the inventive pyrotechnic mixture, leads to the aspect that the container need possess only a relatively thin wall thickness, in view of which the manufacture of the container becomes simpler and less expensive. Thus, for example, containers have been found as being suitable possessing a circumferential wall structure with a wall thickness of 0.5 to 10 mm, and whereby the material of the container consists of metal, in particular aluminum or corrosion-resistant steel, especially preferably aluminum; or consists of ceramic or glass materials, especially silicate. In accordance with the configuration of the container, there are especially preferred wall thicknesses within the range of 0.5 to 2 mm with the employment of separators, as elucidated hereinbelow, or within the range of 4 to 10 mm without separators. The manufacture of aluminum containers with the above-mentioned wall thicknesses is possible in a technologically simple manner; for example, through deep drawing. Separators within the context of this invention may be considered to comprise filters or, respectively, sieves.

The inventive pyrotechnic mixture is present in the container preferably in a loose bulk form; in essence, the loading density of the pyrotechnic mixture should not be higher than the above-indicated preferred bulk density. Furthermore, the pyrotechnic mixture in the container should be protected by means of a sealing element, in particular a plastic or metal foil, from contact with the atmosphere. This sealing element can be arranged inside as well as outside of the container. The sealing element can also be formed by the container itself, when the latter is constructed as a closed shape with "nominal aperture locations", which are only first opened upon igniting of the propellent charge and create a contact with the atmosphere.

The apertures or "nominal aperture locations" in the container can be configured in a multiplicity of designs; however, whereby circular apertures are preferred. The number and the diameter of these apertures can vary in dependence upon the construction of the respective container. For a cylindrical container with an internal volume of 10 $cm^3$, which is charged with 4.5 g of the inventive pyrotechnic mixture and which serves for the inflation of a 12-liter airbag, for example; expedient has been proven to be a quantity of 28 apertures each with a diameter of presently 2.5 mm formed in the circumferential wall of the container. The diameter of these apertures can preferably vary from 1 mm to 5 mm, particularly preferably from 2 mm to 3 mm.

For a controllable combustion of the propellent charge it is preferred that during the inflation of the airbag, there reigns in the interior space of the container a pressure which is higher by a factor of more than 2 than that reigning outside of the container. In this manner, the gases which are generated during the combustion can stream at the speed of sound through the apertures of the container, so that there is achieved an uncoupling of the combustion taking place in the internal space of the container from the processes externally of the container. Under the concept "during the inflation", there is to be understood in this connection, that the pressure difference between the container and the exterior need not reign already during the igniting of the igniting elements, but that it is preferably present during the entire burning-down of the propellent charge.

The container of the gas generator, in a preferred embodiment of the present invention, is encompassed by a spatially open region at least in the area of the openings, which is separated off through the intermediary of a gas-permeable separator from the actual volume of the airbag; in effect, from the volume present between the separator and the airbag casing. This spatially open region can also be configured in such a manner that, during the inflation of the airbag, due to the ignited propellent charge there reigns a higher pressure in this spatially open region than in the volume of the airbag. Another function of the separator consists of in that it serves as a restraining element for solids particles which are slung out of the container during the combustion of the pyrotechnic mixture. Thereby, it must be-noted that the separator is preferably configured in such a manner that it does not exert any or only an insignificant pressure-reducing effect. The primary tasks, however, lie in that the outstreaming particles are to be held back and to be combusted, as well as the bundled hot gas streams are to be expanded. The expanded gas streams represent no danger to the fabric of the airbag. As a result, the folded airbag can be stored closely against the gas generator.

A spatially open region which is expedient within the context of the invention can be formed; for example, when one employs a container which a heavier wall thickness of preferably 4–10 mm, in which the apertures are formed as channels; for instance, as bores or nozzles. The channels can extend linearly or also curvilinearly through the container wall.

In the presence of the separator, the spatially open region is preferably bounded by the circumferential wall of the container and by the separator, whereby the separator is impermeable to solids particles produced during the igniting of the propellent charge and exiting from the container, and which each possess a diameter of at least 0.3 mm, especially preferably of at least 0.1 mm. The separator can be assembled from one or more layers. For instance, the separator can encompass at least one interior separator element and at least one outer separator element whereby, in an especially preferred embodiment, there are provided as separator elements at least one inner metal mesh having a coarse mesh size and an outer metal mesh having a finer mesh size. The metal meshes can be-produced, for example, from a corrosion-resistant steel. The narrower mesh width of the coarse metal mesh consists of preferably 0.4 to 1 mm, particularly preferred is 0.5. to 0.8 mm; and the narrower mesh width of the outer metal mesh consists of preferably 0.1 to 0.3 mm, particularly preferred is 0.1 to 0.25 mm. The wire thickness of the inner metal mesh preferably consists of 0.05 to 0.5 mm, and that of the outer metal mesh of 0.05 to 0.3 mm. The height of the metal meshes corresponds, in general, to double the wire thickness. Arranged between the inner metal mesh and the outer metal mesh can be, as required, a spacer element. Furthermore; for instance, there can also be arranged another filter element of a heat-resistant material; for example, such as stone wool, between the individual separator elements. Furthermore, the assembly of the separator can also be such that outside of the fine metal mesh there is provided a still further coarser metal mesh which serves for the mechanical stabilizing of the fine metal mesh.

The separator should, in general, not be in direct contact with the circumferential wall of the container in the region of the aperture, but is preferably maintained through spacer elements at a predetermined spacing from the circumferential wall of the container. For example, these spacer elements can be constructed as a spiral spring which is positioned about the container, or of protuberances which are located on the external wall surface of the container. On the other hand, the separator can also be maintained with the aid of positioning rings at the desired distance from the container. The spacing of the separator from the container is preferably such that a streaming out of the gases which are generated during the combustion of the propellant charge through the apertures of the container, takes place at the speed of sound. In actual practice, distances of 2 to 8 mm, preferably of 3 to 6 mm, and especially preferably of 3.5 to 5 mm have proven themselves as being suitable.

Furthermore, there can be provided additional spacer elements consisting of a heat-resistant material; for example, ceramic materials, in order to protect the airbag casing during inflating from a contact with the container and the separator, insofar as the latter is present. In this manner there is avoided the danger of a ripping of the airbag casing through excessive heating.

A still further embodiment of the present invention relates to a gas generator for airbags, encompassing:
- a container with a plurality of discharge apertures, in which there is arranged a gas-generating propellant charge which is in the form of granulate particles having a grain size of from 200 μm–12 mm;
- at least one igniting element for the igniting of the propellant charge; and
- a spatially open region which surrounds the container at least in the area of the apertures, and which (a) is bounded by a gas-permeable separator from the volume of the airbag, or (b) is configured in such a manner that at least during a part segment in the inflation of the airbag, due to the ignited propellant charge there reigns in this spatially open region a higher pressure than in the volume of the airbag, or (c) is bounded by a gas-permeable separator and configured in such a manner that, during the inflation, there reigns therein a higher pressure than in the volume of the airbag.

Through the form of the mixture as a granulate, the propellant charge can be present in a considerable reduced quantity in comparison with that of the state-of-the-art, of preferably 0.05 to 0.7 g/l of the gas volume which is to be generated by the gas generator during an inflation of the airbag through the ignited propellant charge. This gas generator can, furthermore, contain one or more of the technological features described above as being preferred.

Yet another embodiment of the present invention pertains to a gas generator for airbags, encompassing:
- a container with a plurality of discharge apertures, in which there is located a gas-generating propellant charge which is present in a quantity of 0.05–0.7 g/l of gas volume, which under environment pressure, is generated by the gas generator during an inflation of the airbag through the ignited propellant charge;
- at least one igniting element for the igniting of the propellant charge; and
- a spatially open region, which surrounds the container at least in the area of the apertures, and which (a) is bounded through a gas-permeable separator from the volume of the airbag, or (b) is configured in such a manner that at least during a part segment of the inflation of the airbag, due to the ignited propellant charge there reigns in this spatially open region a higher pressure than in the volume of the airbag, or (c) is bounded through a gas-permeable separator and configured in such a manner that during the inflation there reigns therein a higher pressure than in the volume of the airbag.

The propellant charge is preferably in the shape of granulate particles possessing a grain size of 200 μm–12 mm. Also, this gas generator can additionally possess one or more of the technological features described above as being preferred.

Finally, the invention also pertains to an airbag arrangement with contains at least one of the above-described gas generators. Thus, for example, it is possible to inflate an airbag through the simultaneous igniting of a plurality of smaller gas generators.

BRIEF DESCRIPTION OF THE DRAWINGS

The invention should furthermore be described through FIGS. 1 through 5 and the examples.

DETAILED DESCRIPTION OF PREFERRED EMBODIMENTS

Figure 1:
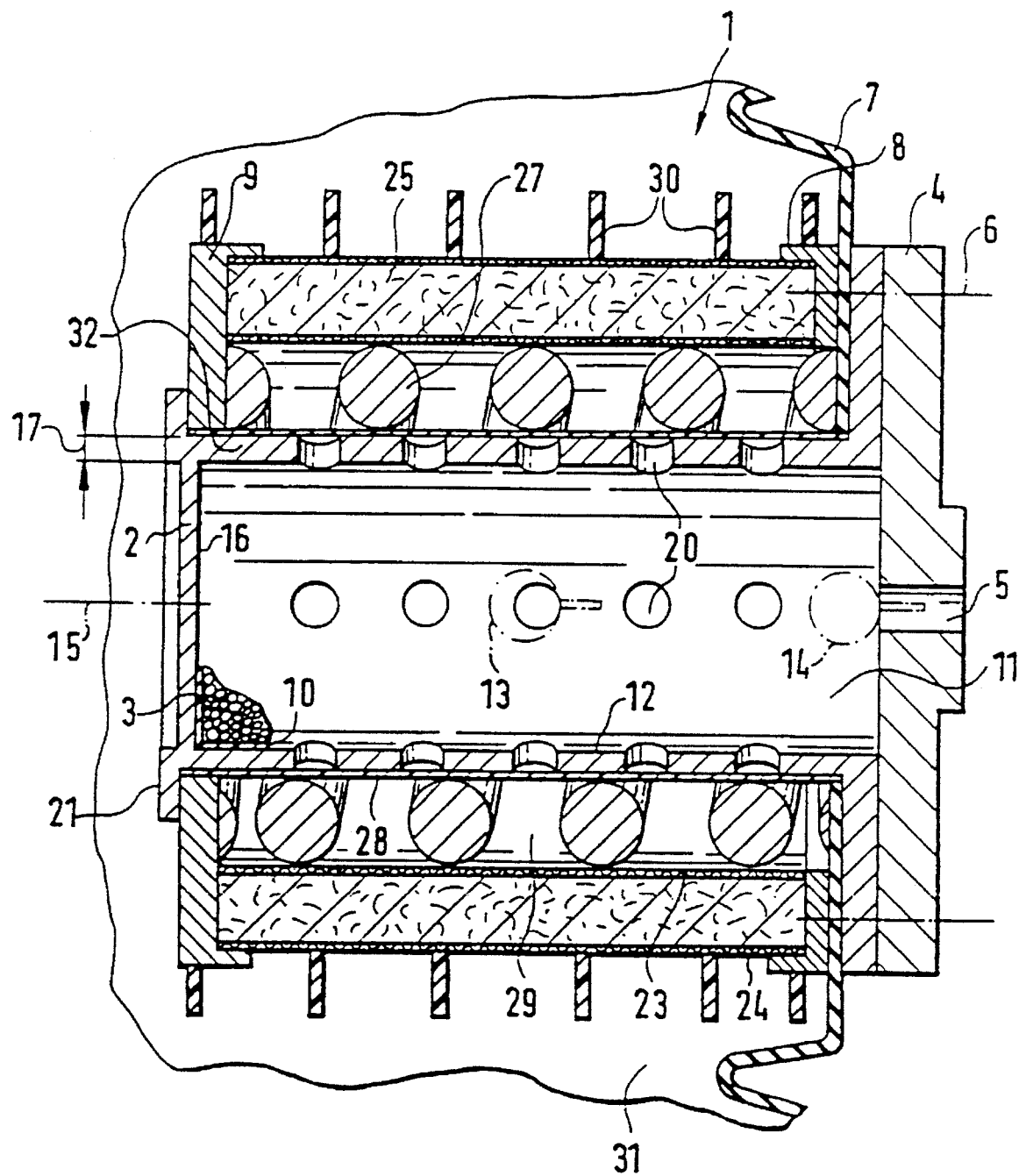
FIG. 1 illustrates a first embodiment of an inventive gas generator.

FIG. 1 illustrates a first embodiment of the inventive gas generator in a longitudinal section.

A gas generator 1 encompasses a container 2, which is constructed of metal (for example, aluminum or corrosion-resistant steel), a granulated propellant charge 3, a closure cover 4 with igniting opening 5, retainer rings 8, 9 for a separator 23, 24, 25 which consists of metal meshes 23, 24 and a therebetween located filter (25) (for example, of stone wool), as well as a spacer element 27 which is constructed as a helical coil spring.

An inflatable airbag 7 is screwed together at 6 with the retainer ring 8 and the closure cover 4.

The container 2 consists of thin-walled sheet-metal, whose wall thickness 17 measures 1 mm. Upon a complete filling of the container 2 with 4.5 g of the propellant charge 3, there can be generated approximately 12 l of gas at a reaction temperature of approximately 1,000° C. in the interior space 11 of the container.

For a larger airbag possessing a volume; for example, of 60 l or 150 l, there must be increased the quantity of the propellant charge, as well as correspondingly the size of the generator. Independently thereof, however, the wall thickness 17 of 1 mm can be maintained; for example, with minor deviations.

A beaded edge 21 fixes the helical coil spring 27, the retainer ring 9, the separator 23, 24, 25 and a combustible foil hose 29 on the container 2.

The container 2 is constructed rotationally symmetrical with respect to the axis 15, and consequently is inexpensive to manufacture; for example, through a deep-drawing process.

The helical coil spring 27 serves as a spacer element for the filter 25 with the metal meshes 23, 24.

The apertures 20 represent the connection with the high-pressure chamber 11 within the container 2 and a spatially open region 29 located between the container 2 and the first metal mesh 23. The filter 25 possesses a low flow resistance. The filter 25, in conjunction with the sieves 23, 24 filters solids particles from the burning-down propellent charge 3 from the gas stream, and enables the combustion of the still not yet combusted particles. Finally, by means of the filters 25 and the metal meshes 23, 24 there can be controlled the gas temperature of the gas which streams into the gas bag 7. The sieves 23, 24 furthermore mechanically support the filter 25 in the gas generator 1.

The apertures 20 are an important parameter for effectuating control over the pressure cycle upon the igniting of the propellent charge, and essentially in the high-pressure space 11 in the interior of the container 2, as well as in the spatially open region 29 and in the volume of the airbag 31.

Spacer rings 30 which; for example, can be constructed from ceramic, have the task of maintaining the collapsing gas bag 7 away from possibly hot components of the gas generator.

After the igniting of the gas-generating composition 3 through one or more igniting elements 13, 14, the foil hose 48 which consists of plastic tears and opens the apertures 20. The gas then expands in the spatially open region 29 between the inner metal mesh 23 and the circumferential wall 32 of the container 2, wherein the region 29 is defined by the helical coil spring 27. The gas then streams through the filter 25 in order to inflate the airbag 7. After the filling sequence, the gas can escape from the airbag in a manner which is not illustrated herein. The airbag 7 then collapses into itself, and can lie against the spacer rings 30. These heat-insulating spacer rings 30 prevent the burning through of the airbag 7 and any resultant endangerment of persons. However, it has been shown that the gas generator only exhibits a temperature of about 50° to 60° C. in its outer regions, so that the spacer rings 30 are not essential.

Instead of the foil hose 2 which contacts externally against the circumference of the container 2, the propellent charge 3 can also be filled into a moisture-impervious foil 10. Upon an igniting of the propellent charge 3, at a specified critical gas pressure, there are punched holes out of the foil 10 in conformance with the apertures 20. The packing of the propellent charge 3 into the foil 10 is simple, inexpensive and extremely accurate with regard to the quantity of the propellent charge. This procedure is carried out separately. The assembling of the propellent charge which is packed into the foil 10, as possibly required together With an integrated igniting medium is simple and can be safely implemented. However, preferred is the utilization of separate igniting elements 13, 14. On the other hand, the foil 10 can also contact only against the inner wall 12, whereby an end wall 16 and the closure cover 10 need not carry any foil 10. Generally, the foil 10 which is arranged in the container 2 possesses the advantage in comparison with the externally arranged foil hose 28 in that, in accordance with the cross-section of the apertures 20, the foil is punched out in a defined manner. With the use of an externally arranged foil hose 20, the latter can swell up and tear in a undefined manner.

The foil 10 can be constructed of metal, such as aluminum or an alloy steel, or can also consist of a plastic material.

In addition to or besides the igniting elements 13, 14, there can also be provided an igniting element outside of the container 2; however, located within the closure cover 4. The container 2 is not limited to the cylindrical shape but can possess any suitable shape; for example, a toroidal or, in essence, a "doughnut" shape.

Figure 2:
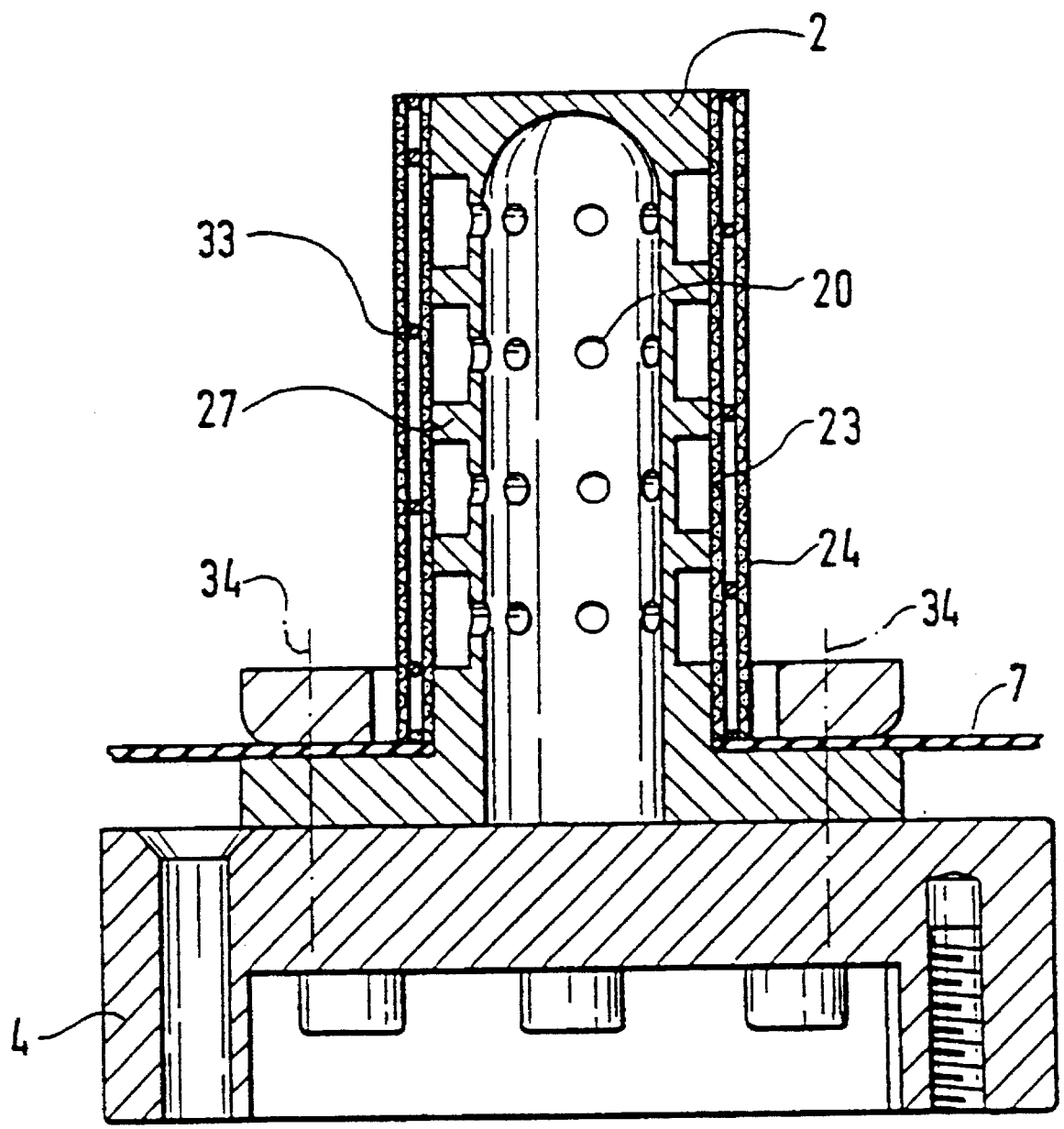
FIG. 2 illustrates a second embodiment of an inventive gas generator.

FIG. 2 illustrates a further embodiment of an inventive gas generator.

A gas generator for an airbag 7 encompasses a cylindrical container 2 which is provided with circular apertures 20. Arranged about the circumferential side of the container 2 is a separator which encompasses an inner sieve 23 and an outer sieve 24. The spacing of the separator from the container 2 is defined by protuberances 28 which are located on the circumferential wall of the container 2. In the illustrated embodiment, the narrower spacing between the inner metal mesh 23 and the circumferential wall of the container measures 3.75 mm.

The distance between the sieves 23 and 24 is maintained by means of a spacer element 33; for example, in the form of a spring.

The gas generator further incorporates a cover 4 which can be fastened to the container 2 by means of screws 33.

Figure 3:
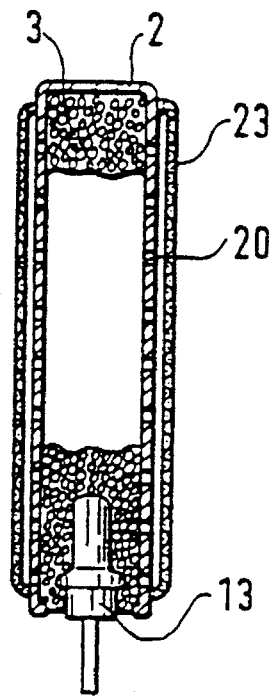
FIG. 3 illustrates a third embodiment of an inventive gas generator.

FIG. 3 illustrates a third embodiment of the inventive gas generator. The container 2 of the gas generator contains a propellent charge 3 in the form of granulates and a separate igniting element 13 which can be ignited either mechanically or electrically. Located in the wall of the container 2 are openings 20, and at a distance from the wall of the container 2 there is arranged a separator 23. The airbag, as well as the fastening of the airbag on the gas generator are not illustrated.

Figure 4:
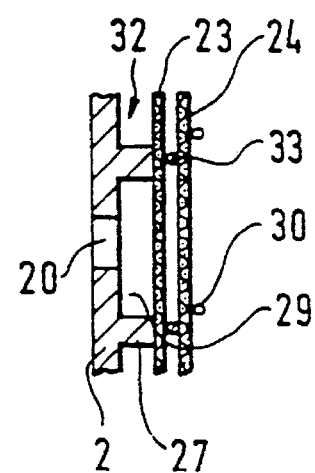
FIG. 4 illustrates a first embodiment of a separator for an inventive gas generator.

FIG. 4 illustrates a first embodiment of a separator element. Illustrated is a section of the container 2 with one aperture 20. Located on the circumferential wall 32 of the container 2 are protuberances or projections 27 which define a spatially open region 29 between the separator 23, 33, 24 and the circumferential wall 32 of the container 2. The separator consists of an inner metal mesh 23 with a mesh size of 125 to 130 µm and a wire thickness of 0.081 mm. The outer metal mesh 24 has a mesh size of 0.49 mm and a wire thickness of 0.3 mm. The thickness of the inner metal mesh is 0.15 mm and that of the outer metal mesh 0.48 mm. The sieves are maintained in position by a spacer element 33; for example, such a helical coil spring or a positioning ring. Furthermore, there are provided spacer elements 30 for the purpose of avoiding any contact of the airbag casing (not shown) with the separator.

Figure 5:
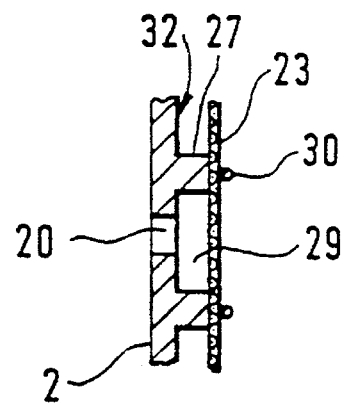
FIG. 5 illustrates a second embodiment of the separator for an inventive gas generator.

FIG. 5. illustrates an embodiment of the separator which is similar to that shown in FIG. 4, whereby the separator consists of only a single metal mesh 23 having a mesh size of 0.130 mm. Also in this case there are provided spacer elements 30 for the protection of the airbag casing (not shown).

Instead of the separators which are illustrated in FIGS. 4 and 5, there can also be formed a spatially open region having a pressure reigning therein which, during the inflation of the airbag, is different from that reigning in the interior space of the container as well as that in the volume of the airbag, in that there is provided a thick housing wall with channels formed therein through which the combustion gases can stream into the volume of the airbag. These channels can extend linearly through the housing wall; however, they can also be curvilinear in shape. When the gas streams through these channels during the inflation of the airbag, then there reigns therein a pressure which differs from that in the interior space and from the volume of the airbag.

In another possible embodiment of the present invention, there can be provided a separator element which contacts directly against the outside of a container; for example, a cylindrical container. In this embodiment, however, there are placed considerable mechanical demands on the strength of the separator elements, so that at a spacing of 2.8 mm, preferably 3 to 6 mm, and especially preferably of 3.5 to 5 mm is preferred between the external circumferential wall surface of the container and the separator (expressed as being the narrower width).

The following example elucidates the production of the inventive pyrotechnic mixture.

EXAMPLE

Components a) Potassium nitrate, Fluka No. 60415 or Merck 5063 b) Sodium azide, Fluka No. 71290 or Merck 6688 c) Nitrocellulose (Coilodium wool N-content 12.2% d) Silicone rubber RTVM 521 (Elastosil 4500) Wacker-Chemie 26.9 parts by weight of potassium nitrate and 52.2 parts by weight of sodium azide were individually comminuted in a rotary mill to a grain size of <80 µm. The comminuted particles were mixed dry with 1.6 parts by weight of nitrocellulose up to homogeneity.

Thereafter, the dry mixture was kneaded with acetone so as to form a plastic mass. Excess solvent was expelled under stirring and kneading for so long until the mass attained a crumbly state. Thereafter the crumbly mass was granulated through an 0.4 mm sieve. The granulate was dried and subsequently the fine particles of less than 200 µm in size strained off, renewedly kneaded and re-granulated or added to the successive charge.

The pre-granulation products obtained in this manner had 19% parts by weight of silicone rubber, which was previously admixed with 4% Hardener T37 (Wacker-Chemie), added thereto and then carefully stirred. Thereafter, the mixture was kneaded until all particles were wetted with silicone rubber. The mixture was then granulated through a 1.6 mm sieve and cured at an elevated temperature.

In the event it is necessary, any fine constituent could again be strained out.

Pursuant to a further embodiment of the present invention, potassium nitrate and sodium azide could also be directly admixed with the silicone rubber in the absence of any interim granulation with nitrocellulose, and thereafter granulated.

We claim:

1. Process for the production of a pyrotechnic mixture in the form of granulates, comprising the steps of:

(a) providing particles of a nitrogen-generating substance, and of an inorganic oxidizing agent having a particle size of from 1 µm to 200 µm, wherein said nitrogen-generating substance is an alkali metal azide, alkaline earth metal azide or ammonium azide, (b) mixing the particles from (a) with liquid silicone rubber, wherein the amount of the silicone rubber is 13 to 28% based on the weight of the total mixture, (c) producing granulates from the materials mixed according to step (b) having a grain size of 200 µm to 12 mm and (d) curing the granulates.

2. Process for the production of pyrotechnic mixtures in the form of granulates, comprising the steps of:

(a) providing particles of a nitrogen-generating substance and of an inorganic oxidizing agent having a particle size of from 1 µm to 200 µm, wherein said nitrogen-generating substance is an alkaline metal azide, alkaline earth metal azide or ammonium azide, (b) mixing the particles from (a) with a binder, (c) producing pre-granulation products from the materials mixed according to step (b) having a grain size of from 20 µm to 5 µm, (d) mixing the pregranulation products from (c) with liquid silicone rubber, wherein the amount of silicone rubber is 13 to 28% based on the weight of the total mixture, (e) producing granulates from the materials mixed according to step (d) having a grain size of from 200 µm to 12 mm, and (f) curing the granulates.

3. Process according to claim 2, characterized in that the binder in step (b) is added in an amount of 1 to 5% based on the weight of the total mixture.

4. Process according to claim 2 or 3, characterized in that in step (b) nitrocellulose is used as the binder.

5. Process for the production of a pyrotechnic mixture according to claim 1 or 2, characterized in that following a grinding step wherein the azide and the inorganic oxidizing agent comprising a nitrate are crushed to a particle size of from 1 µm to 200 µm, liquid silicone rubber is added and subsequently the mixture is granulated.

6. Process according to claim 5, characterized in that an intermediate granulation step follows the grinding step wherein a binder is used.

7. Process according to claim 6, characterized in that the intermediate granulation step is carried out by adding 1.6 percent by weight of nitrocellulose as the binder and further adding a highly volatile solvent for nitrocellulose, and effecting subsequent granulation and drying.

8. Process according to claim 1 or 2, characterized in that a silicone rubber having a viscosity of 10 to 200,000 mPas at 20° C. is used.

9. Process according to claim 1 wherein a hardener is additionally added to mixing step (b).

10. Process according to claim 1 wherein a solvent or suspending agent for the binder is additionally added to mixing step (b).

11. Process according to claim 2 wherein a hardener is additionally added to mixing step (d).

12. Process according to claim 7 wherein the solvent is acetone.

13. Process according to claim 5 wherein a hardener is additionally added prior to said granulation.

\* \* \* \* \*